July 12, 1960

T. W. COULTER 2,944,361

FISHING ROD HOLDER

Filed Aug. 28, 1958

INVENTOR.
THOMAS W. COULTER
BY
ATTORNEY

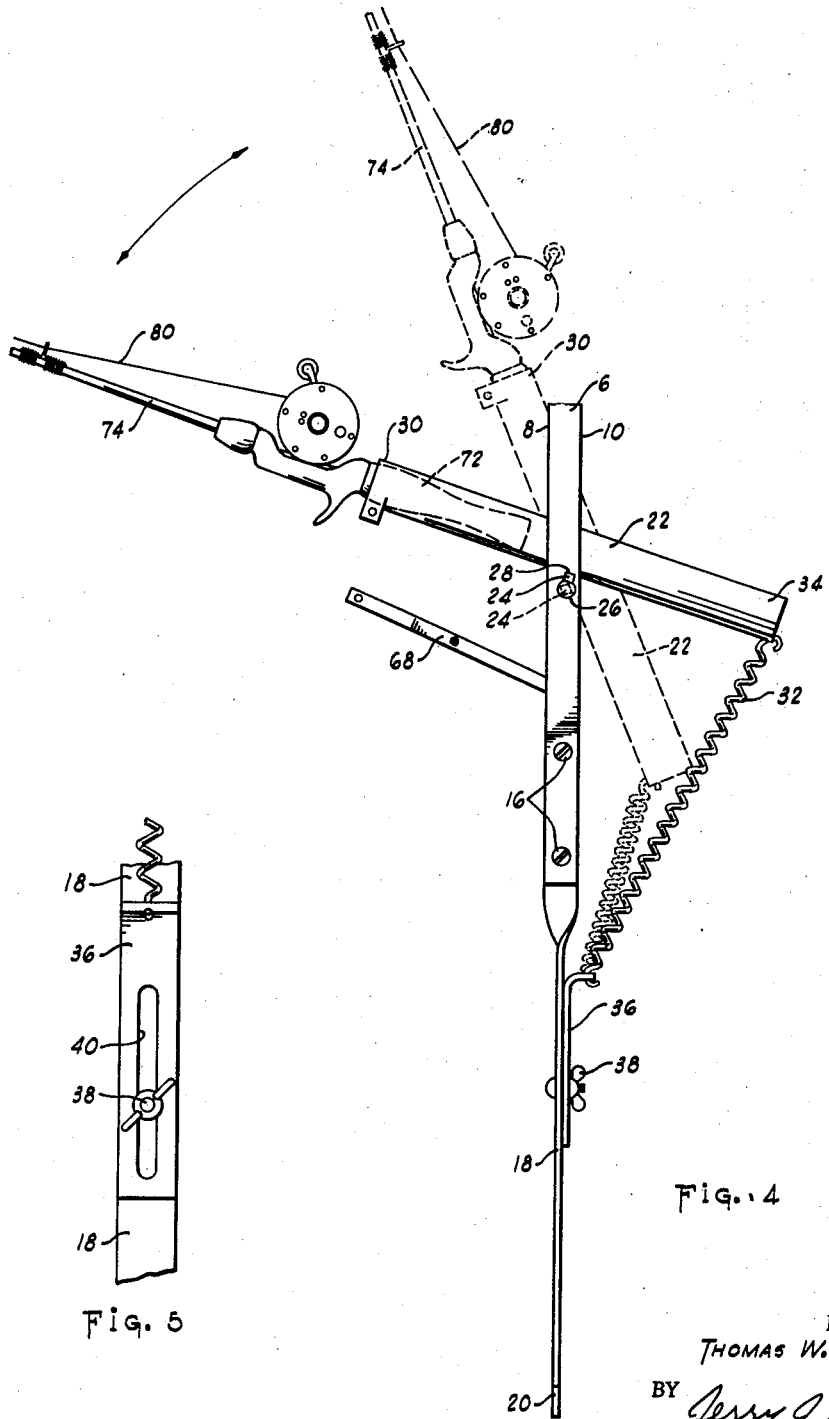

United States Patent Office 2,944,361
Patented July 12, 1960

2,944,361

FISHING ROD HOLDER

Thomas W. Coulter, 1506 NW. 16th St.,
Oklahoma City, Okla.

Filed Aug. 28, 1958, Ser. No. 757,758

8 Claims. (Cl. 43—16)

This invention relates, as indicated, to an improved fishing rod holder.

As is well known in the art, many devices have been developed for holding a fishing rod and automatically pivoting the fishing rod when the outer end thereof is pulled by a fish biting bait on the end of a line extending from the fishing rod. Heretofore, however, such fishing rod holders have either been so delicately constructed that they have been easily damaged by normal handling and storage, or they have been too expensive for commercial use. Prior fishing rod holders almost all use a pivotally supported holding member having a spring connected thereto tending to pivot the holding member in one direction, and a trigger mechanism holding the member against movement by the spring until the mechanism is tripped by a fish as indicated above. The trigger mechanisms heretofore used are difficult to engage or "cock," and have a fixed sensitivity. In other words, if the prior trigger mechanisms are manufactured in such a manner as to be too non-sensitive, the fisherman must do substantial bending and re-shaping of the trigger mechanism to obtain an operative fishing rod holder. Also, prior fishing rod holders are capable of providing only one type of action for a fishing rod held thereby, such that the fishing rod holders are actually useful for catching only a limited size range or a limited number of types of fish.

The present invention contemplates a sturdily constructed fishing rod holder which may be used to catch a wide variety of types of fish, as well as a substantial size range of fish. The present holder utilizes a fishing rod holding member in the form of a tube, such that the handle portion of the fishing rod may be easily secured in the holder and the fishing rod will be positively actuated by a pivoting movement of the tube. The tube may be "cocked" or held against pivotal movement in either of two different ways, each of which provides a substantial different reaction for a fishing rod in the holder when the tube is released for pivoting movement. In other words, one cocking mechanism provides a relatively smooth reaction or pivoting movement for the fishing rod, such as required with smaller fish; whereas, the other cocking mechanism provides a more violent reaction or pivoting movement for the fishing rod, such as would be desirable with larger fish. The trigger mechanism used with the more violent reacting operation may be easily adjusted by the fisherman, without the use of any special tools, to provide the desired sensitivity.

An important object of this invention is to provide a fishing rod holder which will not be damaged by normal handling and storage.

Another object of this invention is to provide a fishing rod holder which may be used to hold substantially any size or design of fishing rod.

Another object of this invention is to provide a novel fishing rod holder which may be used to catch substantially any size or type of fish.

A further object of this invention is to provide a fishing rod holder wherein the trigger mechanism may be adjusted to the desired sensitivity in a minimum of time and without the use of any special tools.

Another object of this invention is to provide a fishing rod holder which may be used in two different ways to provide two different types of actions when the fishing rod holder is tripped.

A still further object of this invention is to provide a fishing rod holder having a long service life, which may be economically manufactured, and which will require substantially no maintenance during the life thereof.

Other objects and advantages of the invention will be evident from the following detailed description, when read in conjunction with the accompanying drawings which illustrate my invention.

In the drawings:

Figure 4 is a side elevational view of a fishing rod holder constructed in accordance with this invention illustrating another type of operation for the holder.

Figure 5 is a rear elevational view of a portion of the holder shown in Figs. 1 and 4 to illustrate the anchoring means for the lower end of the spring.

Figures 1, 2, 3:
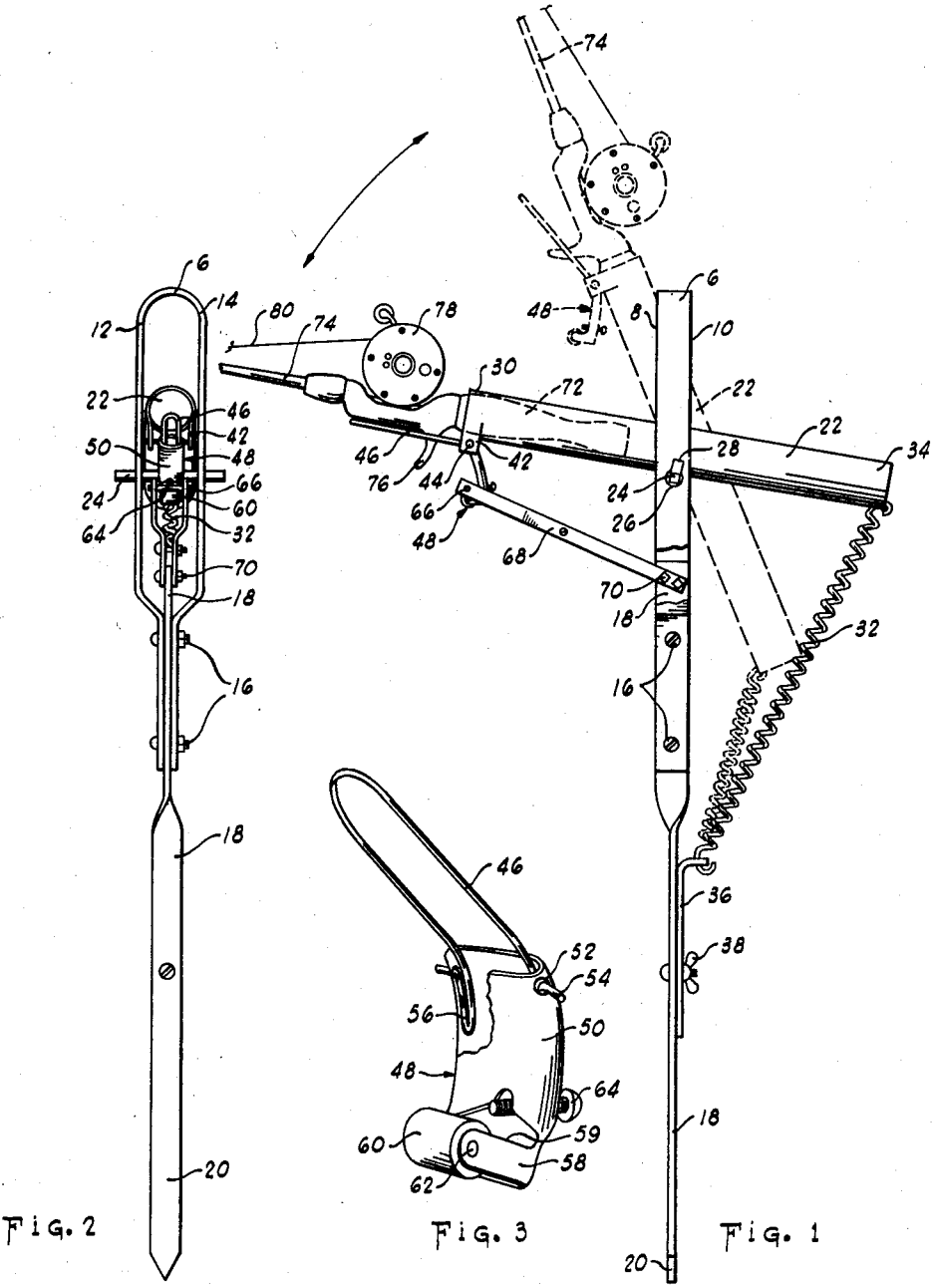
Figure 1 is a side elevational view of a fishing rod holder constructed in accordance with this invention and illustrating operation of the holder.
Figure 2 is a front elevational view of the holder shown in Fig. 1, with the fishing rod removed.
Figure 3 is a perspective view of a trigger mechanism constructed in accordance with this invention, with a portion of the trigger being broken away to illustrate details of construction.

Referring to the drawings in detail, and particularly Figs. 1 and 2, reference character 6 designates a support member or frame having a front or leading edge 8 and a rear edge 10. The support member 6 is preferably formed out of a flat bar bent lengthwise substantially into the form of an inverted U to provide horizontally spaced leg members 12 and 14, as illustrated in Fig. 2, which extend substantially vertically when the holder is supported in operating position. The lower ends of the leg members 12 and 14 of the frame 6 are suitably secured by bolts 16 to a stanchion or leg 18 having a lower pointed end 20. The lower pointed end 20 of the stanchion or leg 18 is provided to facilitate insertion of the stanchion 18 into the ground adjacent a body of water to support the holder in a substantially vertical position as indicated in the drawings.

A tube 22 is pivotally supported at about its center between the leg members 12 and 14 of the support member 6 by a novel connection. A bar or shaft 24 having a square cross section is rigidly secured transversely across the central portion of the tube 22 in any suitable manner, as by welding the shaft 24 to the tube 22. The shaft 24 extends through apertures 26 formed transversely through the leg members 12 and 14. The apertures 26 are horizontally aligned and are of a size to slidingly receive the opposite end portions of the shaft 24, such that the shaft 24 may be turned in the apertures 26 to pivot the tube 22 in a vertical plane. It will also be noted in Fig. 1 that a square or rectangularly-shaped slot 28 is formed in each of the members 12 and 14 in communication with the upper portion of the respective aperture 26. Each slot 28 is of a size to slidingly receive the respective end portion of the shaft 24 and prevent a turning movement of the shaft 24 when the shaft is extended through the slots 28. It will also be noted that each slot 28 extends at an acute angle from the vertical center line of the respective aperture 26 toward the rear edge 10 of the support member 6, such that the forward end 30 of the tube 22 will be raised when the shaft 24 extends through and is held in the slots 28, as will be more fully hereinafter set forth.

A helical tension spring 32 is anchored at its upper end to the rear end 34 of the tube 22 in any suitable manner, such as by extending the upper end portion of the spring 32 through a complementary aperture (not shown) formed in the rear end portion 34 of the tube 22. The lower end of the spring 32 is anchored by a bracket 36 which is secured to the stanchion 18 by a wing nut 38. The wing nut 38 extends through a vertical slot 40 (Fig. 5) in the bracket 36 and is suitably threaded into the stanchion 18, such that the bracket 36 may be adjusted vertically on the stanchion 18 to vary the tension of the spring 32.

The forward end 30 of the tube 22 is provided with a downwardly extending flange 42 on each side thereof, with each flange 42 having an aperture 44 therein. The apertures 44 are horizontally aligned to receive the end portions of a stiff wire 46 forming an actuating lever for a trigger mechanism generally designated by reference character 48. As shown most clearly in Fig. 3, the trigger 48 comprises a tubular housing 50 which is preferably bent lengthwise substantially on the arc of a circle and having apertures 52 in the opposite sides thereof to receive the end portions 54 of the wire 46. It will be observed that the wire 46 is bent somewhat in the form of a U and extends into the housing 50 a substantial distance below the apertures 52. Therefore, when the end portions 54 of the wire 46 are supported on a horizontal axis, a force imposed on the outer portion of the wire 46 will pivot the housing 50. In other words, the housing 50 and wire 46 act as a bell crank to provide movement of the housing 50 upon movement of the wire 46. It will also be noted that the lower portions 56 of the wire 46 extending into the housing 50 to below the apertures 52 are bent to extend adjacent the opposite sides of the housing 50 when the end portions 54 protrude through the apertures 52. Therefore, the end portions 54 of the wire 46 may be moved inwardly into the housing 50 by pressing inwardly on the opposite reaches of the wire 46 for a simple removal and replacement of the trigger mechanism 48 on the tube 22. As previously noted, the end portions 54 of the wire 46 extend through the apertures 44 in the flanges 42 to pivotally secure the trigger mechanism 48 to the forward end 30 of the tube 22.

A pair of flanges or arms 58 are formed on the lower end portion of the housing 50 of the trigger mechanism 48 and extend generally forward from the housing 50 to form a seat 59 on the forward side of the housing 50. A roller 60 is supported between the arms 58 by means of a shaft 62 extending through complementary apertures in the arms 58. It will be observed that the seat 59 extends transversely across the housing 50 and that the roller 60 effectively forms the forward edge of the seat, with the front of the housing 50 forming the rear edge of the seat.

A set screw 64 is threaded through the lower portion of the housing 50 to extend into the seat 59 at a level substantially even with the top surface of the roller 60. The set screw 64 and roller 60 cooperate to straddle a trigger pin 66 secured in the outer end of an arm 68 as illustrated in Figs. 1 and 2.

The arm 68 is preferably formed out of two bars suitably secured by bolts 70 at their rear ends to the upper end of the stanchion 18, such that the arm 68 will extend forward and slightly upward from the support 6 in a fixed position. The pin 66 is secured in the outer end of the arm 68 in any suitable manner to extend horizontally and be engaged by the trigger mechanism 48 as illustrated in Figs. 1 and 2.

The tube 22 is of a size to receive the handle portion 72 of a fishing rod 74 to support the rod in the forward end portion 30 of the tube 22. It should be noted that since the member 22 is in the form of a tube, substantially any size of commercial rod 74 may be inserted in the forward end portion 30 of the tube 22 to provide adequate support for a fishing rod. When a casting type of fishing rod is used, as illustrated in the drawing, the usual finger grip 76 may be extended downwardly through the wire 46 of the trigger mechanism 48 when the fishing rod handle is inserted in the tube 22, which will tend to maintain the reel 78 in the proper position for operation by a fisherman.

*Operation*

The operation of the present fishing rod holder, when using the trigger mechanism 48, is illustrated in Fig. 1. When the holder is not in use, the tube 22 will be extended as illustrated by the dashed lines, with the spring 32 holding the rear end of the tube 22 down, and with the forward portion of the tube 22 being in contact with the top of the support member 6. The fisherman will normally cast his bait (not shown) which is connected to the outer end of the fishing line 80 into the water the desired distance. The handle portion 72 of the fishing rod 74 is then inserted in the forward end of the tube 22 in the manner illustrated in Fig. 1, with the finger grip 76 extending down through the wire 46 of the trigger mechanism 48. The forward end 30 of the tube 22 is then forced downwardly against the action of the spring 32 until the trigger mechanism 48 engages the stationary pin 66 by a seating of the pin 66 in the seat 59. As the roller 60 is forced downwardly around the rear of the pin 66, the spring characteristics of the wire 46 will continually urge the roller 60 against the pin 66, such that as soon as the roller 60 is moved below the pin 66, the housing 50 will spring forwardly until the roller 60 and the set screw 64 are in straddling relation on opposite sides of the pin 66. When the pin 66 is seated between the roller 60 and set screw 64, the forward end 30 of the tube 22 will be held against upward movement, and the fishing rod holder will be in a cocked position. The fisherman can then reel in the line 80 until the line 80 is taut to transmit any movement of the bait to the fishing rod 74. It will be understood that when the tube 22 is pivoted counter-clockwise (when viewed as in Fig. 1) the shaft 24 will be turned in the apertures 26. When the holder is in a cocked position, as shown in the full lines in Fig. 1, the fisherman can leave the holder and fishing rod 74 and attend to other business.

When a fish takes the bait, the outer end of the rod 74 will be forced downwardly an unpredictable amount, depending upon the amount of pull exerted on the line 80 by the fish. A downward force on the outer end of the fishing rod 74 will apply a downward force on the outer end of the trigger actuating lever formed by the wire 46. This force on the wire 46 will tend to pivot the housing 50 of the trigger mechanism 48 counter-clockwise and move the roller 60 rearwardly under the pin 66. When sufficient force is applied on the wire 46, the roller 60 is forced slightly down and rearwardly around the pin 66 to unseat the pin 66 from the seat 59. The spring 32 will then pivot the tube 22 and fishing rod 74 clockwise with a substantial force. The tube 22 is therefore moved to the dashed line position shown in Fig. 1 to provide a substantial pull on the line 80 which will hook the fish nibbling on the bait on the end of the line 80. After the fish is hooked, the spring 32 will allow pivoting movement of the tube 22 and fishing rod 74 as the fish continues to jerk on the line 80 to "play" the fish and normally retain sufficient tension on the line 80 to prevent loss of the fish.

The amount of force required to be imposed on the wire 46 to trip the trigger mechanism 48 when the trigger mechanism is in engagement with the pin 66 will depend upon the position of the set screw 64. It will be apparent that the position of the set screw 64 will control the distance that the crown of the roller 60 extends above the pin 66. In other words, when the set screw 64 is substantially unthreaded from the housing 50, the pin 66 will be substantially below the crown portion of the roller 60 when the mechanism is cocked. Conversely, when the set screw 64 is threaded through the housing 50 into proximity with the respective side of the roller 60, the pin 66 may be moved into the seat 59 between the roller 60 and set screw 64 only a limited distance and a very slight movement of the roller 60 will disengage the trigger mechanism. Therefore, the fisherman merely needs to adjust the set screw 64 to control the sensitivity of the trigger mechanism 48.

As illustrated in Fig. 4, the present holder may also be used to provide a different and somewhat less violent type of action for the fishing rod 74 than that previously described. As before, the tube 22 is normally positioned as illustrated by the dashed lines, with the shaft 24 extending through the apertures 26. In this use of the holder, the trigger mechanism 48 may be removed. As previously described, the trigger mechanism 48 may be easily removed by pressing inwardly on the opposite reaches of the wire 46 and moving the end portions 54 of the wire inwardly into the housing 50 of the trigger mechanism, such that the wire 46 is disengaged from the apertures 44 in the tube flanges 42.

In this second type of operation, the fisherman casts his bait to the desired location in the water, and then the handle portion 72 of the rod is inserted in the forward end portion 30 of the tube 22. The fisherman then lifts upwardly on the rear end portion 34 of the tube 22 against the action of the spring 32. This upward movement of the end 34 of the tube 22 will tend to pivot the tube 22 counter-clockwise and move the end portions of the shaft 24 into the slots 28 when the tube 22 has reached the position illustrated by the full lines in Fig. 4. It may be noted that in this position of the tube 22, the rod 74 is extended upwardly at a slightly greater angle than in the operation illustrated in Fig. 1. When the opposite end portions of the shaft 24 are engaged in the slots 28, the tube 22 will be cocked and prevented from pivoting movement by the edges of the slots 28 engaging the sides of the shaft 24.

When tension is applied on the line 80, the fishing rod 74 will tend to move downwardly to simultaneously urge the forward end 30 of the tube 22 downwardly. Any substantial downward movement of the forward end 30 of the tube 22 will force the shaft 24 downwardly out of the slots 28; whereupon the shaft 24 may rotate in the aperture 26 and the spring 32 swings the rear end 34 of the tube 22 downwardly as illustrated by the dashed lines in Fig. 4. As in the previous operation, the tube 22 pivots clockwise until the forward portion contacts the top portion of the support member 6. However, in this operation the tube 22 is pivoted with less violence than in the embodiment previously described. Also, the spring 32 will allow a pivoting movement of the tube 22 after the fish has been hooked to "play" the fish as previously described. The tension of the spring 32 may be adjusted by adjusting the position of the bracket 36, such that substantially any desired force may be applied on the rear end 34 of the tube 22 to control the force applied on the fishing line 80 when a fish takes the bait.

From the foregoing it will be apparent that the present invention provides a sturdily constructed fishing rod holder which will not be damaged by normal handling and storage. The holder may be cocked in two different ways and suitably adjusted to provide a variety of reactions to a fishing rod held thereby. Furthermore, the trigger mechanism may be easily adjusted by the fisherman to the desired sensitivity in a minimum of time without the use of special tools. The present holder may also be used with substantially any design or size of fishing rod; the holder is simple in construction and may be economically manufactured.

Changes may be made in the combination and arrangement of parts or elements as heretofore set forth in the specification and shown in the drawings, it being understood that changes may be made in the precise embodiments disclosed without departing from the spirit and scope of the invention as defined in the following claims.

I claim:

1. In a holder for supporting a fishing rod and swinging the fishing rod when the outer end of the rod is pulled by a fish, a frame having vertically extending and horizontally spaced leg portions, each of said leg portions having an aperture therethrough and a rectangular-shaped slot therethrough communicating with the upper portion of the aperture, the aperture and slot in each leg portion being aligned with the aperture and slot in the other leg portion, a shaft journaled in said apertures, said shaft having a substantially square cross section and being of a cross sectional size to slidingly fit in said slots and be held against turning movement by the edges of said slots when extended through said slots, a tube rigidly secured to the shaft between said leg portions and extended at a right angle to the axis of the shaft, said tube being of a size to receive the handle end of the fishing rod in one end thereof and support the fishing rod substantially in alignment with the tube, and a tension spring anchored to the opposite end of the tube and to the frame below said apertures to continually urge said one end of the tube upwardly.

2. A holder as defined in claim 1 characterized further in that said slots extend from the respective apertures at an acute angle from the vertical in a direction to position the tube at an angle with said one end of the tube above said opposite end when the shaft is raised into said slots.

3. A holder as defined in claim 1 characterized further to include a stanchion secured to the lower end of the frame and having a lower pointed end for insertion in the ground to support the frame.

4. A holder as defined in claim 1 characterized further to include a pin carried by the frame in a horizontal position below said one end of the tube, and a trigger carried by said one end of the tube to engage said pin when the tube is pivoted to move said one end of the tube downwardly a predetermined distance, said trigger having a releasing lever thereon positioned to be actuated by movement of the fishing rod to release said trigger from said pin.

5. In a holder for supporting a fishing rod, a tube having a forward end and a rear end and being of a size to telescopically receive the handle of the fishing rod in the forward end thereof, means for pivotally supporting the central portion of the tube for pivotal movement of the tube in a vertical plane, a spring anchored between the rear end of the tube and said means for constantly urging the forward end of the tube upwardly, a trigger pin carried by said means under the forward end portion of the tube in a position to extend horizontally, and a trigger pivotally secured to the forward end portion of the tube in a position to engage said pin when the forward end of the tube is moved downwardly to a point slightly above the rear end of the tube, said trigger being in the form of a bell crank having one arm thereof forming an actuating lever extending forwardly from the tube and the other arm thereof extending downwardly from the actuating lever, said other arm having a transversely extending seat formed on the forward side thereof for engaging the lower portion of said pin and holding the forward end of the tube down against the action of said spring, and a roller carried by said other arm forming the forward edge of said seat to facilitate the release of the trigger when the fishing rod is bent.

6. A holder as defined in claim 5 characterized further to include a set screw threaded through said other arm in a position to extend forwardly into the rear edge of said seat and limit the seating of said pin in said seat to control the force required to be applied on said actuating lever for dis-engaging the trigger from said pin.

7. A holder as defined in claim 5 characterized further in that said other arm is in the form of a hollow housing, and said actuating lever is in the form of a bent wire having the opposite end portions extending into said housing and its opposite ends extending through the opposite sides of said housing for pivotally securing the trigger to the forward end portion of the tube, said wire being extended into said housing a sufficient distance to pivot said housing when said actuating lever is pivoted.

8. In a holder for supporting a fishing rod and swinging the fishing rod when the outer end of the rod is pulled by a fish, comprising a vertically extending frame, said frame having an aperture extending horizontally therethrough and a rectangularly-shaped slot extending horizontally therethrough communicating with the upper portion of said aperture, a shaft journaled in said aperture having a substantially square cross section and being of cross sectional size to slidingly fit in said slot and be held against turning movement by the edges of said slot when extending through said slot, a tube rigidly secured to the shaft and extending at a right angle to the axis of the shaft, said tube being of a size to receive the handle end of the fishing rod in one end thereof and support the fishing rod substantially in alignment with the tube, and a tension spring anchored to the opposite end of the tube and to the frame below said aperture to continually urge said one end of the tube upwardly.

References Cited in the file of this patent

UNITED STATES PATENTS

| | | |
|---|---|---|
| 693,071 | Rudd | Feb. 11, 1902 |
| 2,564,840 | Glenn | Aug. 21, 1951 |
| 2,661,563 | Adams | Dec. 8, 1953 |
| 2,740,219 | Harden | Apr. 3, 1956 |
| 2,744,351 | Smith | May 8, 1956 |
| 2,804,277 | Kinder | Aug. 27, 1957 |
| 2,821,041 | Hughes | Jan. 28, 1958 |
| 2,835,065 | Schwartzkoff | May 20, 1958 |